US008317216B2

(12) United States Patent
Treude et al.

(10) Patent No.: US 8,317,216 B2
(45) Date of Patent: Nov. 27, 2012

(54) COUPLING APPARATUS

(75) Inventors: Hans-Walter Treude, Wilnsdorf (DE);
Andreas Schneider, Olpe (DE);
Markus Topp, Nümbrecht (DE)

(73) Assignee: PINTSCH BUBENZER GmbH,
Kirchen-Wehbach (DE)

( * ) Notice: Subject to any disclaimer, the term of this patent is extended or adjusted under 35 U.S.C. 154(b) by 374 days.

(21) Appl. No.: 12/532,450

(22) PCT Filed: Apr. 29, 2008

(86) PCT No.: PCT/EP2008/003470
§ 371 (c)(1),
(2), (4) Date: Oct. 19, 2009

(87) PCT Pub. No.: WO2008/135204
PCT Pub. Date: Nov. 13, 2008

(65) Prior Publication Data
US 2010/0109278 A1    May 6, 2010

(30) Foreign Application Priority Data

May 3, 2007  (DE) .......................... 10 2007 020 770

(51) Int. Cl.
*B60T 7/12*    (2006.01)
(52) U.S. Cl. ........................................ 280/432; 280/427
(58) Field of Classification Search .................. 280/432,
280/441.1, 427, 428, 423.1, 474
See application file for complete search history.

(56) References Cited

U.S. PATENT DOCUMENTS

| 3,231,295 | A |   | 1/1966  | Till |
|---|---|---|---|---|
| 4,065,149 | A | * | 12/1977 | Roth ............................ 280/432 |
| 4,385,772 | A | * | 5/1983  | Mackey ....................... 280/432 |
| 5,224,727 | A | * | 7/1993  | Ramskugler ................. 280/432 |
| 5,690,347 | A |   | 11/1997 | Juergens et al. |
| 7,971,894 | B2 | * | 7/2011 | Staude ......................... 280/432 |
| 2005/0212256 | A1 |   | 9/2005 | Cole |

FOREIGN PATENT DOCUMENTS

| DE | 29 49 933 A1    | 6/1981 |
| DE | g8311661 U1     | 4/1984 |
| DE | 102006047456 A1 | 4/2008 |
| EP | 1498292 A1      | 1/2005 |
| EP | 2069188 B1      | 6/2009 |
| GB | 1 205 314       | 9/1970 |
| GB | 2 365 398 A     | 2/2002 |

OTHER PUBLICATIONS

International Search Report, PCT/EP2008/003470, published Aug. 6, 2008 (3 pages).
English language translation of the International Search Report, PCT/EP20081003470, mailed Dec. 17, 2009 (7 pages).

* cited by examiner

*Primary Examiner* — Tashiana Adams
(74) *Attorney, Agent, or Firm* — Hooker & Habib, P.C.

(57) ABSTRACT

The present invention relates to a coupling apparatus for the pivoted coupling of a vehicle having two vehicle sections, with coupling elements which are arranged to pivot towards each other, and which can be permanently coupled to a vehicle section. A brake arrangement operates between the coupling elements and forms an adjustable frictional grip between the coupling elements, which blocks the ability of the vehicle sections to pivot toward each other. In addition, the brake apparatus includes a hydraulic cylinder unit which operates on multiple radially acting brake elements.

16 Claims, 7 Drawing Sheets

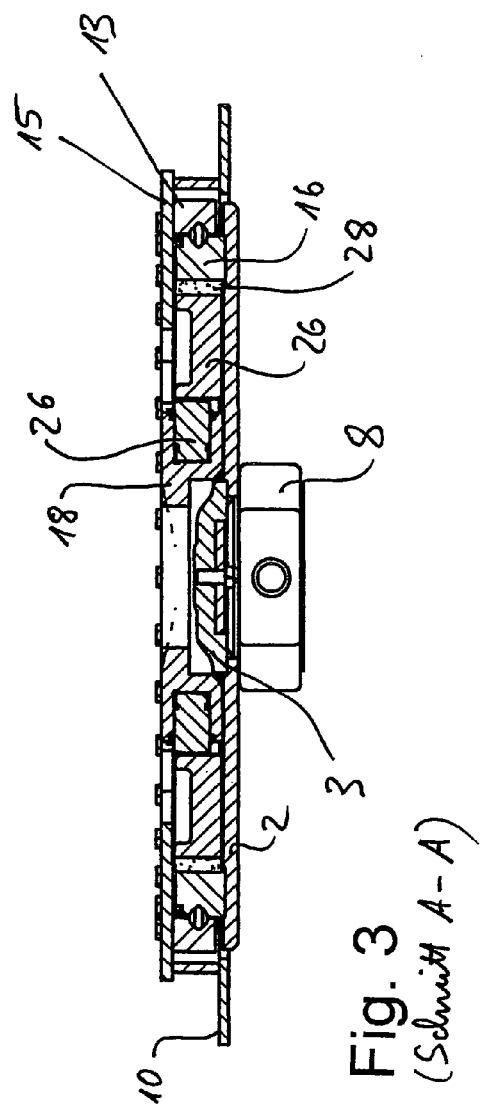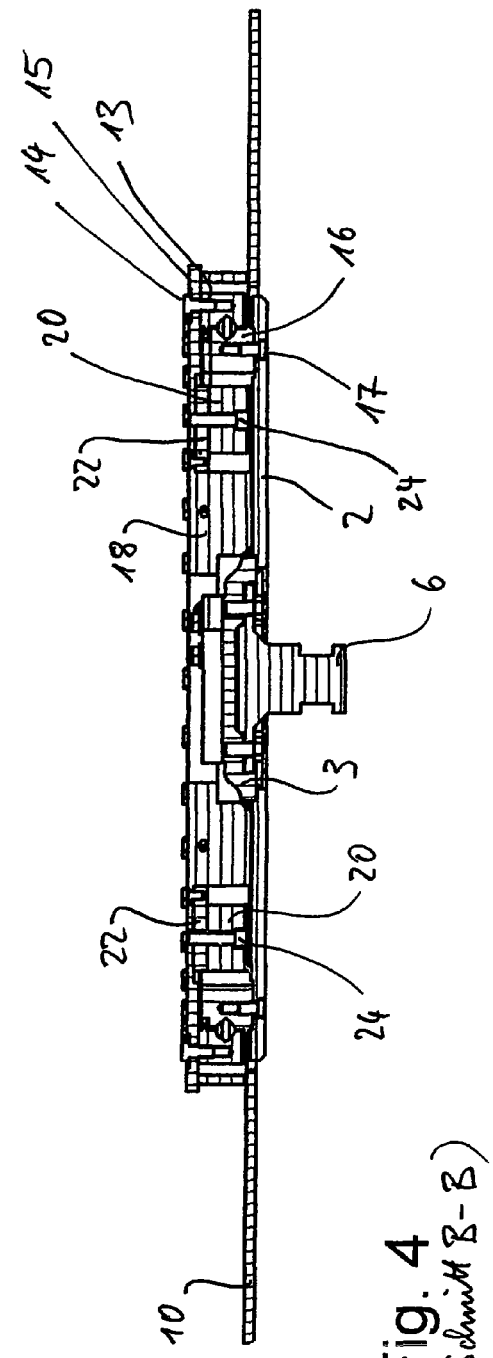

COUPLING APPARATUS

FIELD OF THE INVENTION

The present invention concerns a coupling apparatus (hereinafter designated, "coupling") to enable a joining of two motor vehicle units, wherein coupling comprises two mutually pivotal elements acting in a horizontal plane. The pivotal elements are installed, respectively, in each of the motor vehicle units and a brake arrangement is interposed between them in order to assure an adjustable frictional closure therebetween, so that an unwanted sway of one vehicle unit in reference to the other is restrained.

BACKGROUND OF THE INVENTION

Couplings of this type are already known in regard to commercial vehicles. A large number of designs have been published for couplings in tractor trailer design.

Customarily, a saddle mounted trailer equipped with such a coupling is attached to a tractor unit by a centrally positioned kingpin penetrating a support disk. This arrangement is referred to as a "fifth wheel". A saddle connection consists of a coupling plate having a recess, into which a kingpin can be inserted and be locked against turning by a closure mechanism. The surface of the coupling plate defines the plane of slewing between a tractor and a trailer at the coupling level. At the same time, this surface is made frictional and upon which a plate encompassing the kingpin can safely rotate. In this way, the tractor and the trailer are bound together and enabled to turn about the kingpin. In the case of certain conditions of driving, especially where brake action occurs in sharp turnings, jack-knifing can occur, wherein the tractor and the trailer reach a minimum angle of closure together, so that the entire vehicle assembly is no longer controllable. A swinging of the trailer back and forth in increasing arcs can occur under some circumstances. Like problems are found with articulated busses, truck trailers and even conjoined rail cars.

A generally accepted concept is based on a principle that a saddle linkage is to be stiffened by a more or less strongly damped brake arrangement, i.e. by a an appropriate damping apparatus. U.S. Pat. No. 3,231,295 proposes, for example, a rotatable kingpin arrangement in the trailer connection, which exhibits its braking effect by a brake drum and a loop-type brake. The braking action is carried out, in this case, with a rod, which engages the motor vehicle brake assembly. U.S. Pat. No. 4,065,149 proposes a rotating, saddle plate installed on a tractor about a vertical axle. This saddle plate is to be turn-fast attached to the trailer extension by an oval kingpin. The rotation of the saddle plate can be restricted by an internally placed, pneumatic drum brake. The operation of this arrangement can be initiated by the brake system of the vehicle. GB 2 365 398 discloses a damping system interposed between the tractor and the trailer, which is intended to repress a tendency to jackknife. To accomplish this purpose, a hydraulic damping element is provided, the resistance of which is adjustable by opening and closing a compensation system. The damping can be carried out by either visco-electric or visco-magnetic means.

The damping here can have a relation to the angle posed by the tractor and trailer to one another, which may be measured by the relation of the brake action of the vehicle. U.S. Pat. No. 5,690,347 brings forth another concept, wherein the brake assembly operates with brake elements, which act simultaneously between the tractor and the trailer and are designed as eccentrically operating brake cylinders. GB 1 205 314, US 2005/0212256 A1 and DE 29 49 933 all present further ideas.

The demands made on a functional coupling apparatus are contradictive: first, it is necessary to create an enormous braking moment in order to restrain a jackknife effect, when one considers the weight of loaded tractor trailer units, which units are commonly used in commercial service. Second, a compact and space saving construction is required, so as not to interfere with payable volume, i.e. load, to be carried. The above cited concepts only partially fulfill the requirements. None of them dominate practical applications. A further demand is that a coupling having a brake system or may be easily mountable must be integrated into existing, standardized dimensioning.

BRIEF SUMMARY OF THE INVENTION

In consideration of the above, a purpose of the present invention is to make available an improved coupling, which better fulfills the above requirements and also to set aside, at least partially, the stated disadvantages.

The invention is characterized, in that an invented brake apparatus includes a single, cylindrical hydraulic unit, which acts on a plurality of radially acting braking elements. This construction is very compact and also enhances a required braking action. A multiplicity of hydraulic cylinders, acting respectively on an equal number of radially distributed brake elements can be assembled in a space saving form. The annularly encircling braking elements may operate by respective cylinder-piston arrangements. Thus, force is better transferred to each braking element with its braking surface, whereby a true frictional area can be optimally employed and loss from wear is reduced. Local variations in braking pressure are also reduced and efficiency is increased.

A single infeed fitting may be provided, through which hydraulic fluid enters and is apportioned by distribution lines to appropriate hollow cylindrical spaces. A system of this design is especially free of leakage, easily deaerated and reliable in operation. Embodiments may include an internally bored, interconnective, one-piece hydraulic unit, hereinafter designated as a "hydraulic block" which is especially compact and robust. Embodiments may also include four brake elements, which act at right angles to one another and are respectively driven by at least two cylinder-piston units. These are space saving and fit within the assigned space of an annular brake arrangement.

In yet other embodiments the hydraulic action may be increased by a power-multiplying linkage drive between the cylinder-piston elements and the brake elements. The drive may be designed as a connecting lever, which, by the linked binding between the cylinder-piston unit and the brake element, is particularly easy to engage and disengage.

Embodiments may include simple securement of a coupling by a standard steering wedge insertion in a saddle plate of a tractor. Such steering wedge arrangements are generally placed above the pivot center between the trailer and on a tractor mounted saddle plate. It is the purpose of the steering wedge arrangement to control the opposed inside-outside wheel sets of the trailer during driving turns.

Yet other embodiments may include a coupling, wherein the operating pressure from the hydraulic system can be directed to control the frictional connection between the two coupling elements. Such a control can increment working pressure into a multiplicity of control steps. Applications of this would be, for example, vehicle speed, departure angle between tractor and trailer, and rate of change of the departure angle. Also involved would be weight of tractor trailer, weight of load, steering angle and characteristics of brake action of the tractor. Values, corresponding to the above applications allow vehicle-specific action planning to be determined and adjusted by control. Sensors may be provided to capture these values, which sensors deliver the necessary data to the control system. For maintenance and supervision, control can be electronically bound to one or more display devices and/or operate automatic maintenance equipment where possible. This occurs advantageously by a so-called CAN-bus or by another field bus of equivalent design. A field bus is to have a standardized data transmission facility functioning to and from the control.

An articulated truck, in particular a tractor-trailer, a bus, or a rail mounted coach may include a coupling in accord with the above cited claims.

An embodiment of the invention is explained and described in greater detail with the aid of a drawing. There is shown in:

DETAILED DESCRIPTION OF THE INVENTION

FIGS. 1 to 6 present an embodiment of the present invention, wherein, the assembly and the function of an invented coupling apparatus is demonstrated.

Statements in the following text regarding directions and locations, such as forward, behind, above, right and left, serve for the positioning of parts of the assembly of the coupling in a vehicle, relative to the forward driving direction and which assembly is in a certain section of an articulated vehicle. The objects positioned lie behind and out of sight of the driver, who sits forward thereof.

Figure 1:
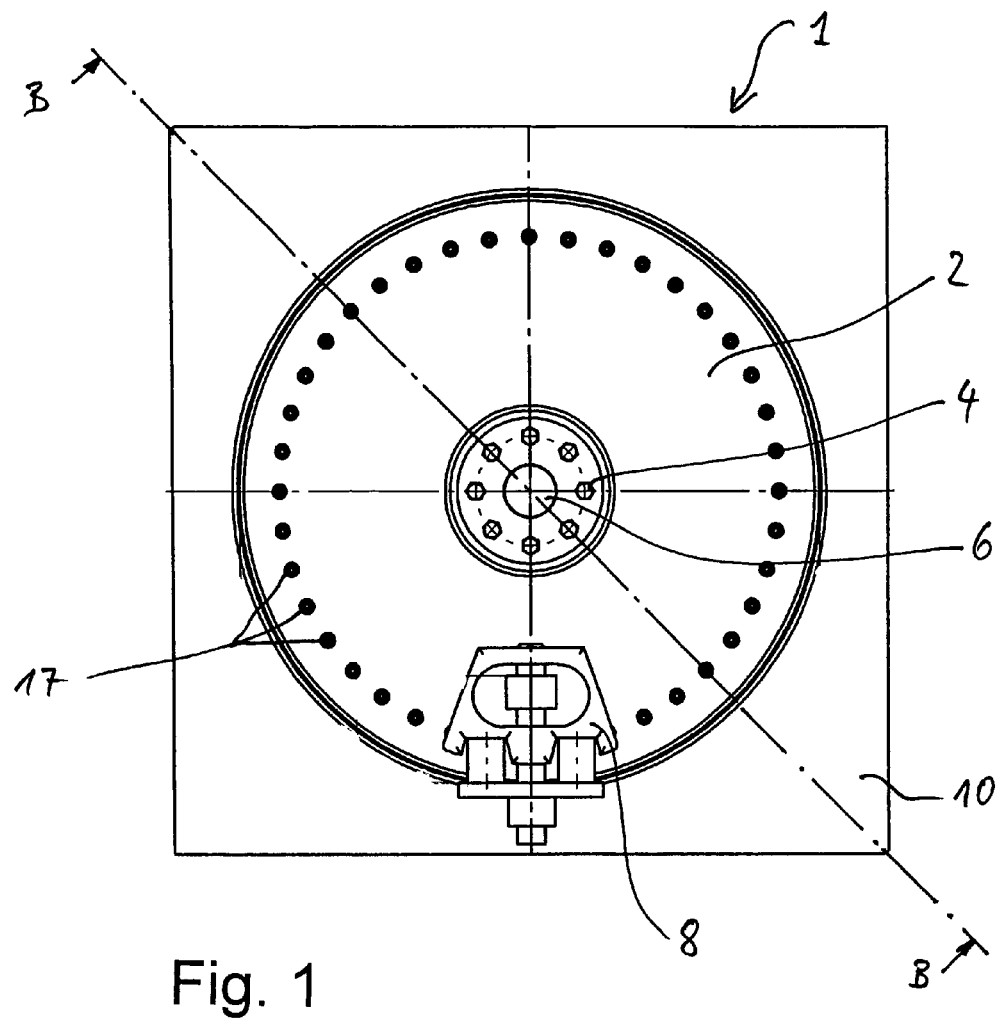
FIG. 1 a view from below of an invented coupling,
FIG. 2 a view from the rear side of the coupling of FIG. 1,
FIG. 3 a cross-sectional view of the coupling of FIG. 1 (Sec A-A in FIG. 6),
FIG. 4 a sectional view of the coupling of FIG. 1 (Sec. B-B),
FIG. 5 an exploded view of the coupling of FIG. 1,
FIG. 6 a view from above, showing the coupling of FIG. 1,
FIG. 7 a presentation in a plurality of views and sections of a hydraulic cylinder block from the coupling views of FIGS. 1 to 6,
FIG. 8 a view from above of an alternative embodiment of an invented coupling, and
FIG. 9 a block diagram of a control for an invented coupling.
Figure 2:
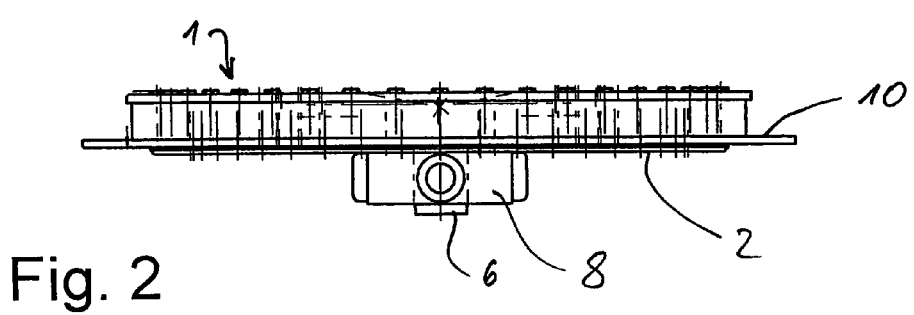

The underside of the coupling assembly 1, as shown in FIG. 1, shows the bottom of the pivoting plate 2, onto which the kingpin is turn-fast affixed thereto by circularly disposed bolts 4. That is to say, the pivoting plate 2 turns with the kingpin 6 and vice versa. To this pivoting plate 2 is attached a steering wedge 8. The pivoting plate 2 turns in bearings in the carrier plate 10. The carrier plate 10 is fastened, preferably by welding, to the (not shown) chassis of the trailer. The pivoting plate 2, is centered by the kingpin in a recess of a coupling plate (not shown) and is subjected to horizontal forces which arise between the tractor and the trailer. By the steering wedge 8, the pivoting plate 2 is turn-fast connected to the coupling plate of a tractor (neither being shown). The steering wedge 8 is seated in a corresponding recess on the rear end of the coupling plate, whereby insertion and release of the kingpin 6 can easily be carried out.

The bottom of the pivoting plate 2 lies flatly against a next higher, facing surface of the coupling plate. Contrary to conventional vehicles with saddle mounted trailers, in the here depicted coupling 1, in the case of road curve turning or maneuvering operations of the tractor-trailer combination, a simultaneous rotation between the pivoting plate 2 and the coupling plate does not occur. Rather, the rotation does occur between the pivoting plate 2 and the carrier plate 10. This shift in rotation is due to the fact that the steering wedge 8 resists any turning deflection between the pivoting plate 2 and the coupling plate of the vehicle.

The bearing arrangement between the pivoting plate 2 and the carrier plate 10 is a turntable 12 (see FIG. 5), which serves as a rotational bearing. This bearing arrangement is subjected to both tensile forces acting between the frame and the tractor in a horizontal direction as well as support forces acting in vertical directions. Accordingly, the outer ring 13 of the turntable 12 is affixed to the cover flange 15 by bolts 14 and the inner ring 16 is fastened by bolts 17 to the pivoting plate 2. In a case of driving in a curve, or in maneuvering operations, with this arrangement, the tractor unit and the trailer can swing counter to one another while the pivoting plate 2 and the carrier plate 10 are turned against each other by the turntable 12.

Figure 5:
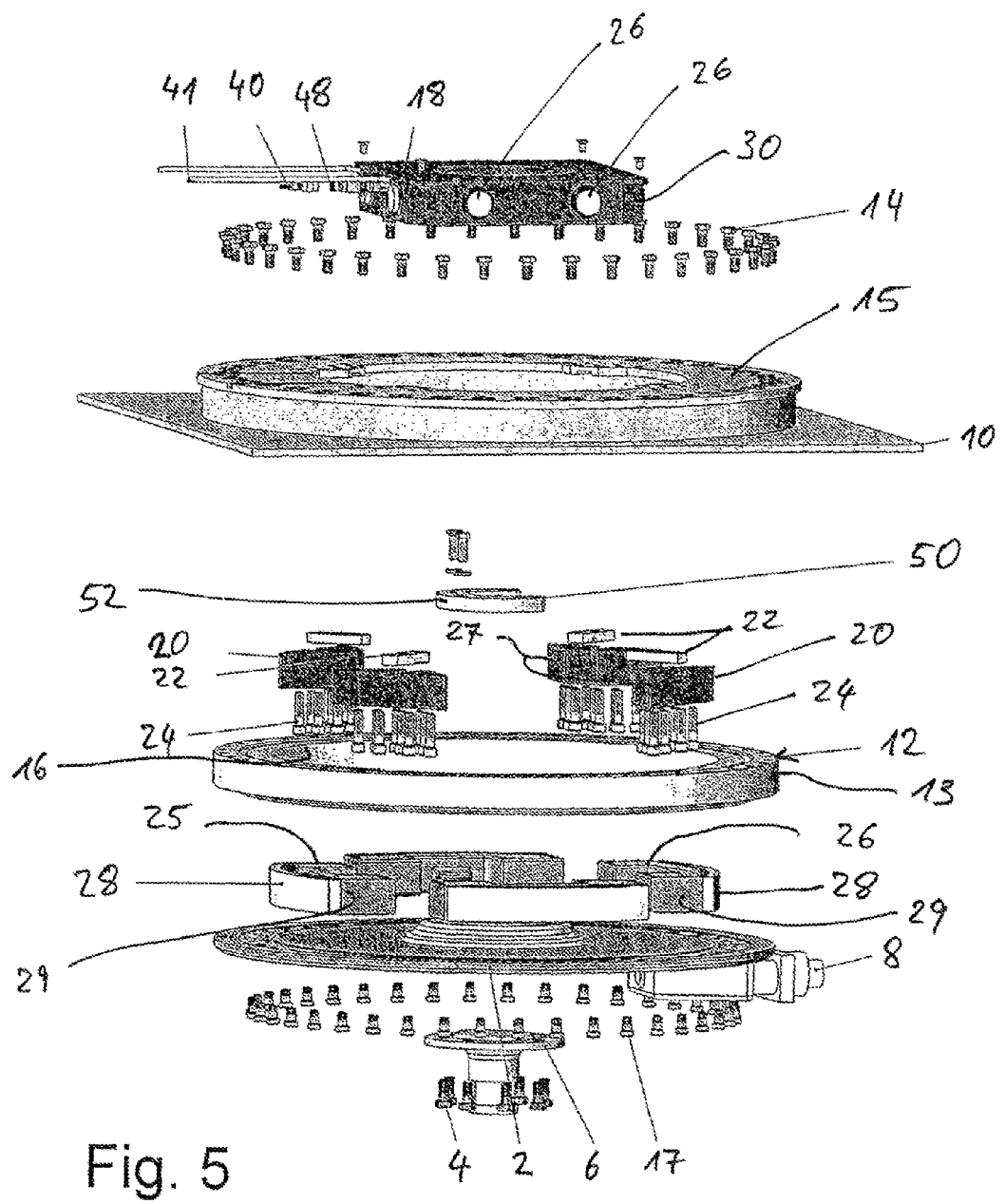
Figure 6:
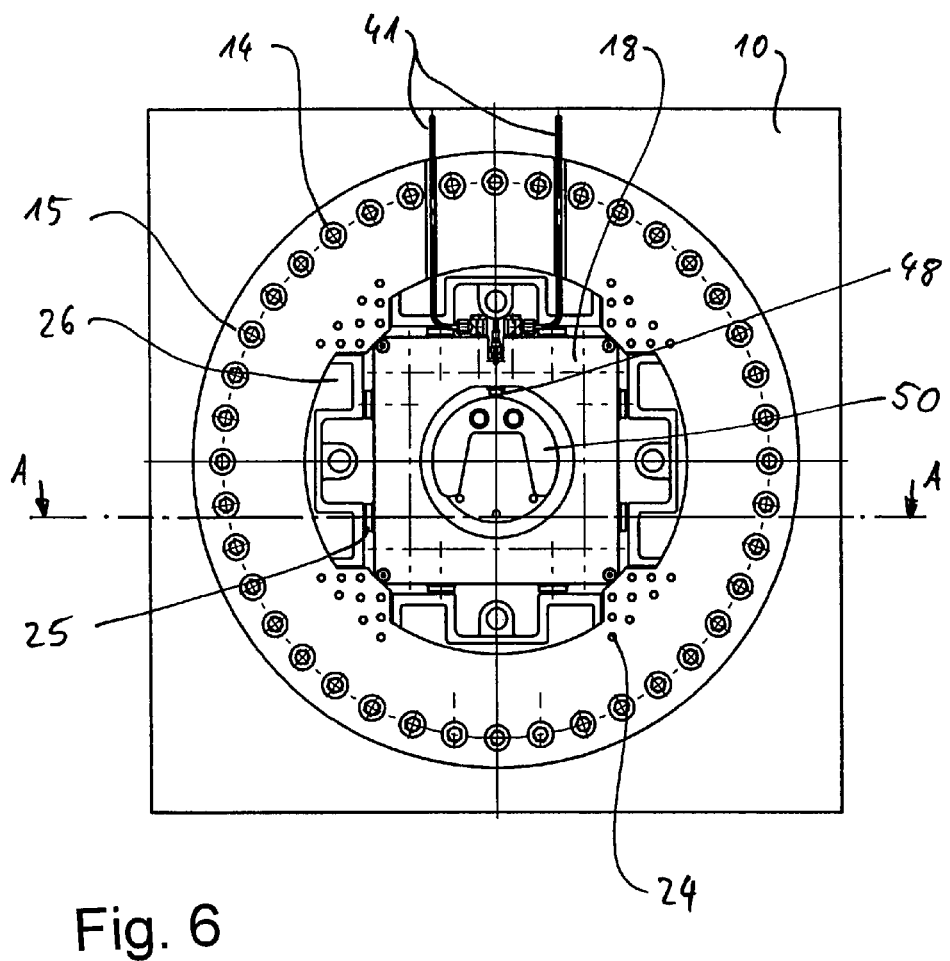
Figure 7:
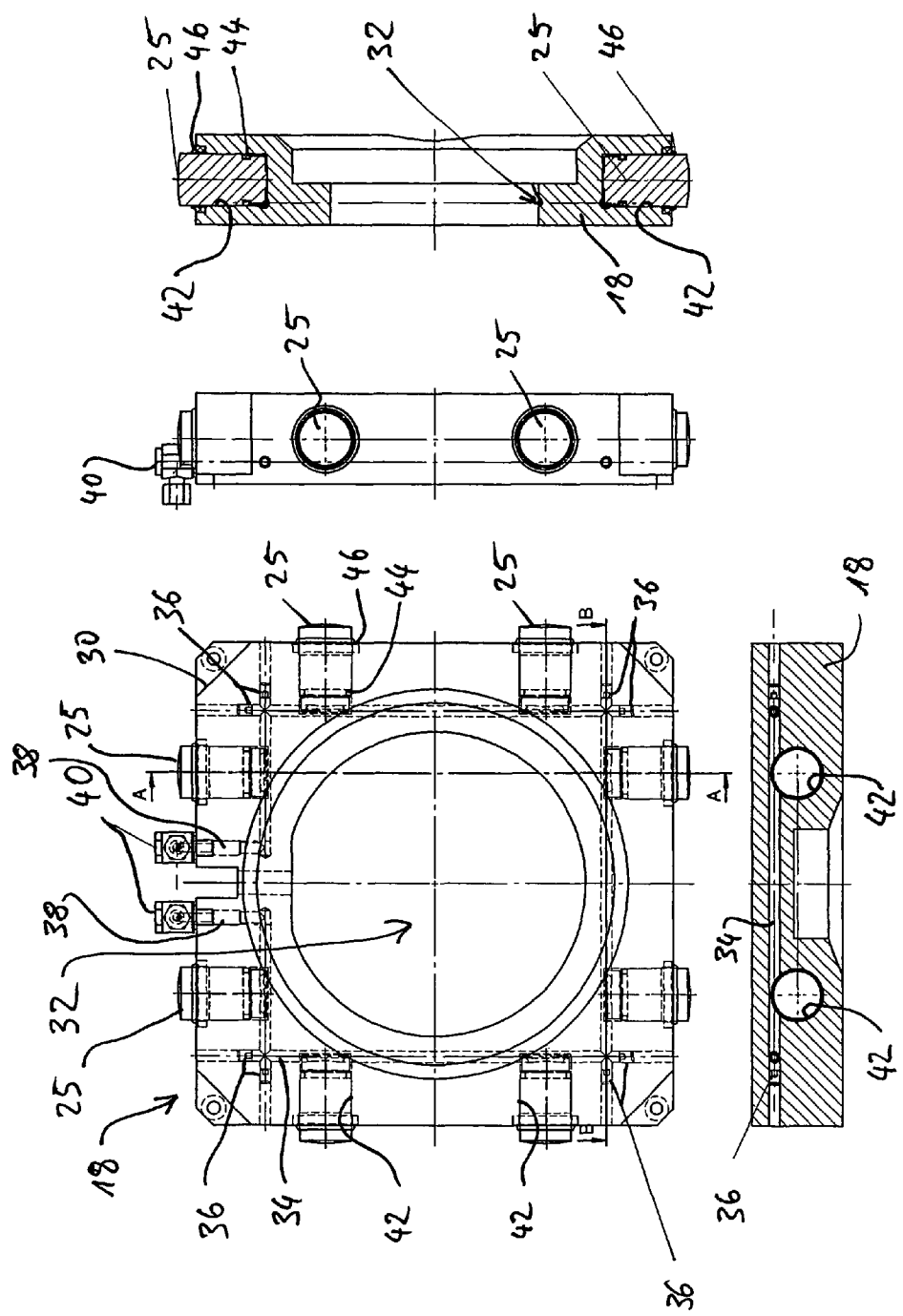

In order to restrict back and forth slewing of tractor and trailer, i.e., to brake the motion, the following is provided: in the interior of the carrier plate 10 is placed a hydraulic block (see FIGS. 5, 6, 7). The block securement is of the force-fit type and effected by four support plates 20. The support plates 20 are respectively affixed to the cover flange 15 by adjustment springs 22 and bolts 24. By the hydraulic pistons 25, the hydraulic block 18 acts on the brake blocks 26, which move outward. The brake blocks 26 possess, on their outer surfaces frictional brake lining material 28.

Upon the said slewing of the tractor-trailer sections, especially under non-braked conditions, the pivoting plate 2 will turn together with the inner ring 16 of the turntable 12 relative to the brake blocks 26 which function with the hydraulic block 18, which is affixed to the carrier plate 10. Upon a command for braking, the pistons 25 push the brake blocks 26 radially outward. The brake linings 28 frictionally engage the inside peripheral surfaces of the inner ring 16 and accordingly restrict rotating movement, according to such radial force as is available from the pistons 25. The forces so engendered, are then directed, by the brake blocks 26, which lie with their outer sides 29 on the corresponding side surfaces 27 of the support plates 20, into the support plates 20 and from there through the adjustment screws 22 into the cover flange 15, and thus into the carrier plate 10, that is to say, into the saddle equipped trailer chassis. The turnable bearing arrangement is stiffened. Besides the load input in the cover flange 15, the adjustment springs 22 have the function, with their inward extending end faces, of centering the mitered corners 30 of the hydraulic block 18 within the coupling assembly.

In the case of the embodiment of the present invention, the maximum braking moment is about 70,000 Nm and the pressure in the hydraulic system runs to some 420 bar. The hydraulic block 18 (see FIG. 7) has an essentially square outline and is recessed in the middle section by opening 32. By this opening 32, it becomes possible for the hydraulic block 18, in a space saving manner, to accept the anchoring socket 3 for the affixing of the kingpin 6 on the pivoting plate 2 (as seen in FIG. 4). The hydraulic block is bored therewithin, by a peripherally running hydraulic passage 34.

This passage 34, consists of a plurality of intersecting hydraulic connections, these being through-drillings and dead-end borings. The resulting open ends of these borings are closed of with plugs of sealant 36. Two feed borings 38 open the hydraulic passage 34 with hydraulic fittings 40.

The hydraulic passage 34 runs through the upper zone of the hydraulic block 18 and intersects the base area of the cylinder openings 42, within which the pressurized pistons 25 act in their piston-cylinder function. The hydraulic passage 34 intersects the cylinder openings 42 respectively in the inner and upper area, so that it forms the highest point in the hydraulic block 18. This placement enables a reliable and safe fluid input and outlet in the hydraulic block for the hydraulic system, as well as an opening for the release of trapped air. This release of air is to be done prior to placing the equipment in operation. The pressurized pistons 25 run within their respective cylinders and are isolated by appropriate sealants 44 and possess properly positioned wipers 46.

Figure 9:
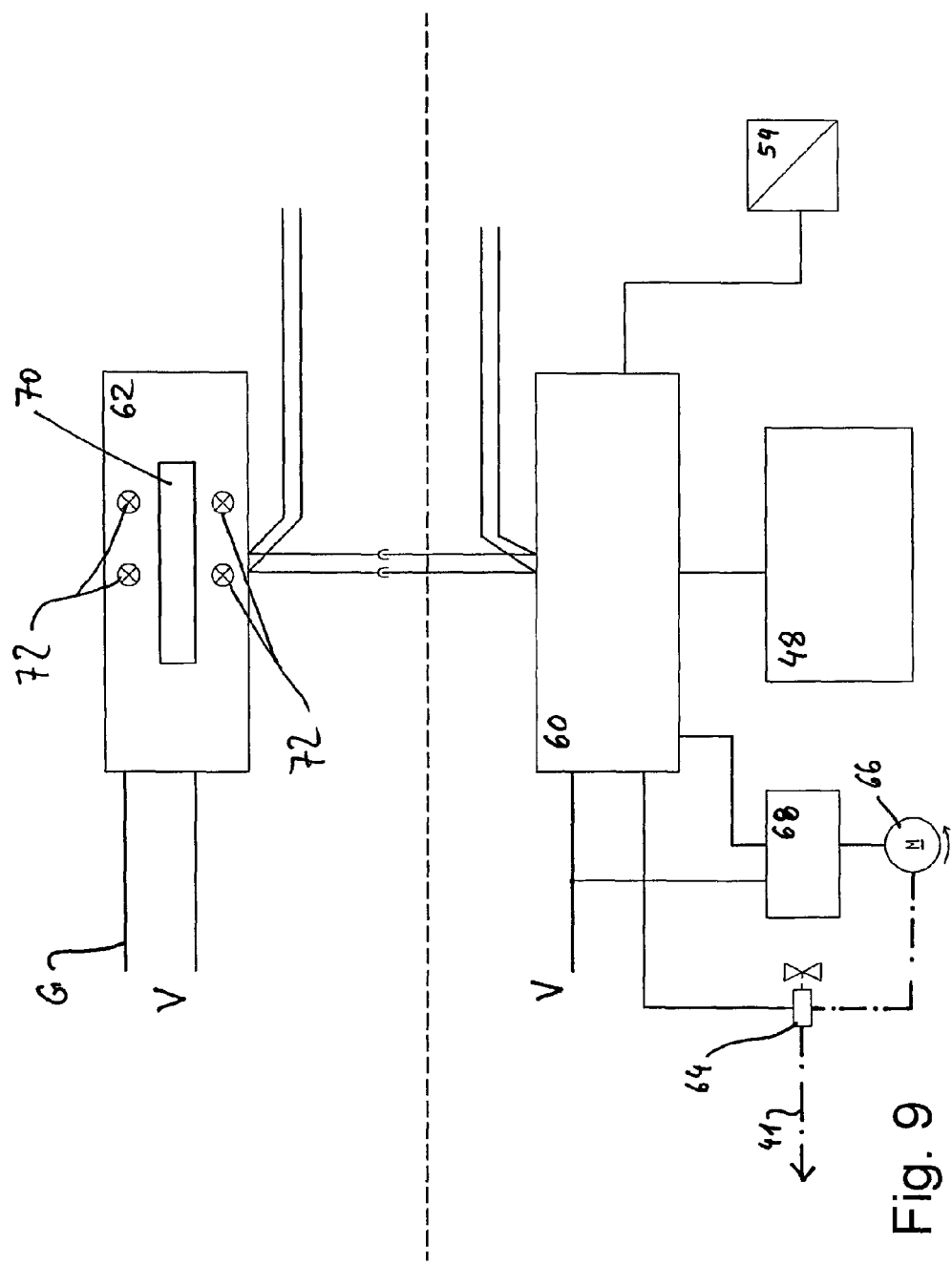

The hydraulic fittings 40 are connected with hydraulic lines 41, which are connected to corresponding aggregates 64, 66 (see FIG. 9). This fitting aids in deaeration of the hydraulic lines.

The coupling apparatus shown in FIGS. 1-6, possesses a hydraulic block as shown in FIG. 7, which acts upon four braking blocks 26 by two pistons 25.

Figure 8:
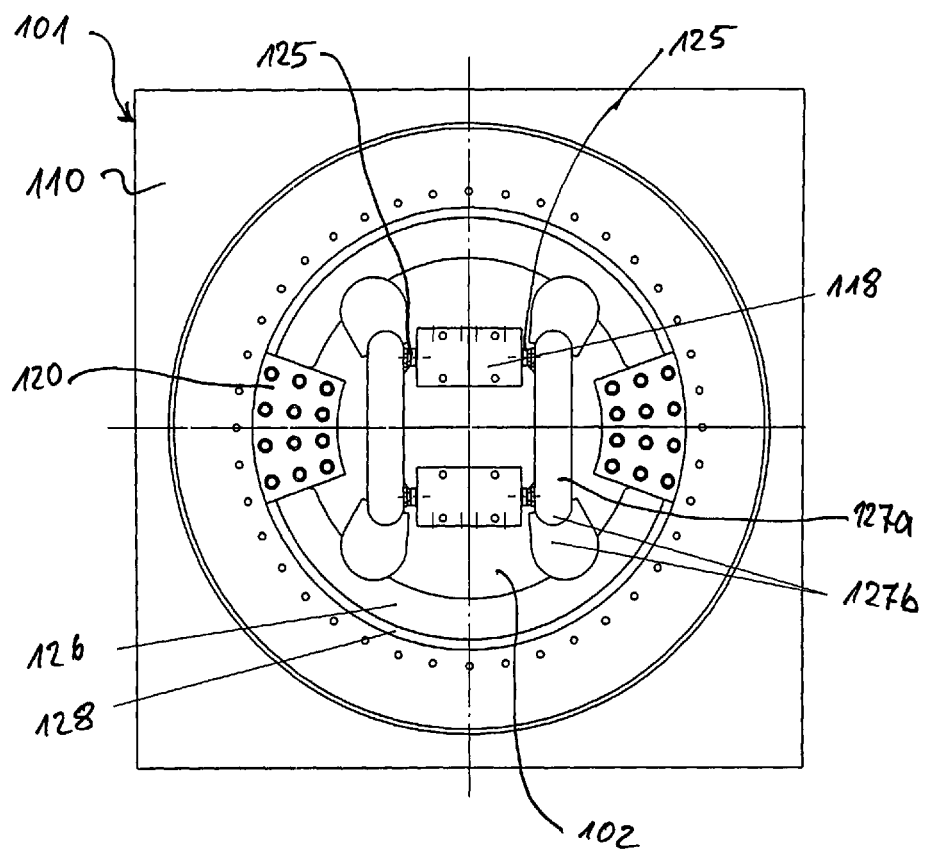

FIG. 8 shows a coupling arrangement 101, wherein two hydraulic blocks 118 are provided. The hydraulic blocks act respectively on the cross ties 127a, activated by two opposed hydraulic pistons 125, which move in counter directions. By this activation, the cross ties 127a, by brake force, act through cams 127b to move the brake block 126 with its brake lining 128. Again in this case, the forces to which the brake lining 128 and brake blocks 126 are subjected are transferred to the corresponding support plates 120, which are affixed to the cover plate 110. In this arrangement, where two separate hydraulic blocks 118 are present, the situation is that the same principles (lever-transference) function as in the case with the single hydraulic block as is evident from FIGS. 1-7.

The invented brake action is controlled by rotational angularity. That is to say, the brake action becomes reinforced upon an increasing angularity between the pivoting plate 2 and the carrier plate 10. At the same time, with an increase in swaying of the tractor and trailer units, the braking force becomes greater. Associated therewith, as FIGS. 1-6 show, an analogous direction sensor 48 is combined with an eccentric shaped component 50 (see FIGS. 5, 6). The eccentric piece 50 is coupled to the pivoting plate 2 and the directional sensor 48 reacts with the hydraulic block 18. Between the active head of the directional sensor 48 and the eccentric piece 50, a fissure-like open space is to be seen, which is defined by the peripheral surface 52 of the eccentric piece 50, which faces the directional sensor 48. The peripheral surface contour is designed in such a manner that, upon a turning of the eccentric piece 50 relative to the directional sensor 48, the distance across the space changes. This change of the opening geometry of the space is detected by the directional sensor 48. The signal, emitted on such an occasion, is "read" by control 60 (see FIG. 9) as a corresponding sway or angular deviation of one tractor-trailer section relative to the other. The control result is that a regulation is imposed on the pressure which activates the pistons 25. When this occurs, then a servo valve 64 (solenoid valve) and/or a hydraulic pump 66 is activated.

FIG. 9 shows a corresponding control 60 (see FIG. 9) operating through a so-called CAM-Bus and is additionally connected to a display and service apparatus 62. The control 60 is connected to a directional sensor 48 (determines angle of sway) and is also bound to a pressure sensor 54, which samples in the passage 34 (see FIG. 7) to determine available hydraulic pressure. A source of electric current V supplies the display/operational assembly 62 and provides the control system 60 with a potential of 10 to 32 volts. The control 60 is likewise connected with a pressure control valve 64, which regulates the input pressure in the hydraulic line 41 and is supplied with hydraulic fluid by the motorized pump 66. This fluid is subsequently fed to the hydraulic block 18. The hydraulic motor is protected by a circuit breaker 68, which is also communicates with the control 60. Besides rotational angular signals from the sensor 48 and pressure signals from the pressure sensor 54, the control 60 is enabled to pick up the additional signals from the CAN-bus interface. Such signals are delivered over the line G, for example, to the display-operational device assembly 62. This display-operational device 62 possesses an indicator 70, which shows the angle existing between the tractor and the trailer. Further, additional service elements 72 can be provided, so that various conditions of operation can be electronically interrogated and adjusted. Besides the CAN-Bus interface, it is also possible that other field bus connections can be realized. For example, these could be, but are not limited to: CANopen, Device Net, J1939, CLeANopen, LIN-Bus, KWP2000. The concept here used for control is not limited to a control system in the classical manner, but is intended to encompass regulation apparatuses wherewith the output braking power, which is related to hydraulic pressure, can be kept under control by a plurality of control circuits. For example, besides the already discussed regulated values and services such as slewing angle and change of velocity of the slewing, in addition, vehicle speed, pressure, total truck weight, load weight, and brake action of the tractor-trailer, can be considered singly or in their interaction.

Besides the above described embodiment(s) of the invention, wherein the coupling apparatus can be activated on a tractor-tailer by inserting the kingpin 6 through the coupling plates, there are also applications wherein the pivoting plate 2 is bolted or welded directly to the appropriate vehicle unit. Such embodiments are suited to application in articulated buses, truck trailers, and rail borne multi-car trains (such as street cars).

Further variations and embodiments of the present invention can be adapted by the expert within the limits of the following claims.

What is claimed is:

1. A coupling apparatus for a turnable linkage of two motor vehicle sections and which coupling apparatus possesses mutually pivotal elements, wherewith said elements can be affixed together and have a brake arrangement acting therebetween, for the establishment of an adjustable frictional union between the coupling elements, which restrains a mutual slewing of the two motor vehicle sections, the brake arrangement comprising a single hydraulic cylinder unit, which acts upon a plurality of radially functioning braking elements, the hydraulic cylinder unit comprising a feed fitting for hydraulic fluid, a distribution line system and a plurality of cylindrical spaces for the reception of hydraulically activated pistons.

2. A coupling apparatus in accord with claim 1, wherein each of the braking elements is driven by a plurality of cylinder-piston elements.

3. A coupling apparatus in accord with claim 1 wherein the hydraulic cylinder unit is made as a one-piece object.

4. A coupling apparatus in accord with claim 1 wherein the plurality of braking elements comprise four braking elements functioning at right angles to one another, which four braking elements are respectively activated by at least two cylinder-piston elements.

5. A coupling apparatus in accord with claim 1 comprising force-increasing coupling drives and a plurality of cylinder-piston elements, said drives located between the cylinder-piston elements and the braking elements.

6. A coupling apparatus in accord with claim 5, wherein each coupling drive comprises a cam respectively linked to at least one of said plurality of cylinder-piston elements and to at least one of said plurality of braking elements.

7. A coupling apparatus in accord with claim 1, one motor vehicle section including a saddle plate, wherein a coupling element is turn-fast affixed with the saddle plate by a steering wedge.

8. A coupling apparatus in accord with claim 1 comprising a control for the control and regulation of a frictionally activated union between the coupling elements by the acting hydraulic pressure in the hydraulic cylinder unit and whereby the control is so designed, that it adjusts the operational hydraulic pressure exerted on the basis of at least one of the following control or regulation values (a), (b), (c), (d), and (e): (a) vehicle road speed, (b) slewing angle between the motor vehicle sections, (c) maximum steering lock, (d) brake operation, and (e) vehicle braking.

9. A coupling apparatus in accord with claim 8, wherein one or more sensors are provided for the determination of at least one of the following operational values (a), (b), (c), (d), and (e) related to the vehicle: (a) vehicle road speed, (b) slewing angle between the vehicle sections, (c) weight of vehicle, (d) maximum steering lock, and (e) braking.

10. A coupling apparatus in accord with claim 8 wherein the control is in communication with an apparatus via a CAN-Bus, said apparatus comprising at least one of the following (a) and (b): (a) a display apparatus and (b) a service apparatus.

11. A vehicle provided with a coupling apparatus in accordance with claim 1.

12. The vehicle of claim 11 wherein the vehicle is one of the following vehicles: a truck, a bus, a rail mounted train car.

13. The coupling apparatus of claim 1 wherein the hydraulic cylinder unit extends around an opening, the hydraulic cylinder unit defining a perimeter around the opening, the plurality of cylindrical spaces spaced along said perimeter.

14. The coupling apparatus of claim 1 comprising a kingpin and a socket fixedly attaching the kingpin to one of the said pivotal elements, the socket at least partially surrounded by the hydraulic cylinder unit.

15. A coupling apparatus for a turnable linkage of two motor vehicle sections and which coupling apparatus possesses mutually pivotal elements, wherewith said elements can be affixed together and have a brake arrangement acting therebetween, for the establishment of an adjustable frictional union between the coupling elements, which restrains a mutual slewing of the two motor vehicle sections, the brake arrangement comprising a single hydraulic cylinder unit, which acts upon a plurality of radially functioning braking elements, and a control for the control and regulation of a frictionally activated union between the coupling elements by the acting hydraulic pressure in the hydraulic cylinder unit and whereby the control is so designed, that it adjusts the operational hydraulic pressure exerted on the basis of at least one of the following control or regulation values (a), (b), (c), (d), and (e): (a) vehicle road speed, (b) slewing angle between the motor vehicle sections, (c) maximum steering lock, (d) brake operation, and (e) vehicle braking.

16. A coupling apparatus for a turnable linkage of two motor vehicle sections and which coupling apparatus possesses mutually pivotal elements, wherewith said elements can be affixed together and have a brake arrangement acting therebetween, for the establishment of an adjustable frictional union between the coupling elements, which restrains a mutual slewing of the two motor vehicle sections, the brake arrangement comprising a single hydraulic cylinder unit, which acts upon a plurality of radially functioning braking elements, and force-increasing coupling drives, said drives located between the cylinder-piston elements and the braking elements, wherein each coupling drive comprises a cam respectively linked to at least one of said plurality of cylinder-piston elements and to at least one of said plurality of braking elements.

* * * * *